United States Patent
Johnson et al.

(10) Patent No.: US 8,856,683 B2
(45) Date of Patent: Oct. 7, 2014

(54) RESTRICTED USER INTERFACE NAVIGATION

(75) Inventors: Eric Johnson, Ottawa (CA); Ronald Anthony Dicke, Ottawa (CA)

(73) Assignee: BlackBerry Limited, Waterloo, Ontario (CA)

(*) Notice: Subject to any disclaimer, the term of this patent is extended or adjusted under 35 U.S.C. 154(b) by 405 days.

(21) Appl. No.: 13/402,942

(22) Filed: Feb. 23, 2012

(65) Prior Publication Data

US 2012/0151414 A1 Jun. 14, 2012

Related U.S. Application Data

(63) Continuation of application No. 11/530,230, filed on Sep. 8, 2006, now Pat. No. 8,151,212, which is a continuation of application No. PCT/CA2005/000373, filed on Mar. 11, 2005.

(60) Provisional application No. 60/551,830, filed on Mar. 11, 2004.

(51) Int. Cl.
*G06F 3/048* (2013.01)
*G06F 3/0485* (2013.01)
*G06F 17/30* (2006.01)
*G06F 3/0489* (2013.01)

(52) U.S. Cl.
CPC ........ *G06F 17/30905* (2013.01); *G06F 3/0485* (2013.01); *G09G 2340/145* (2013.01); *G06F 17/30867* (2013.01); *G06F 3/0489* (2013.01)
USPC .......................... 715/814; 715/773; 715/810

(58) Field of Classification Search
CPC ............................. G06F 3/0481; G06F 3/0488
USPC .......................................... 715/814, 773, 810
See application file for complete search history.

(56) References Cited

U.S. PATENT DOCUMENTS

| | | | | |
|---|---|---|---|---|
| 8,151,212 B2* | 4/2012 | Johnson et al. | ............... | 715/814 |
| 8,259,137 B2* | 9/2012 | Tsai | ............... | 345/684 |
| 8,683,378 B2* | 3/2014 | Bull et al. | ............... | 715/786 |
| 8,723,822 B2* | 5/2014 | Williamson et al. | ............... | 345/173 |

OTHER PUBLICATIONS

Johnson et al.; "Restricted User Interface Navigation", U.S. Appl. No. 11/530,230, filed Sep. 8, 2006.

* cited by examiner

*Primary Examiner* — David Phantana Angkool
(74) *Attorney, Agent, or Firm* — Perry + Currier, Inc.

(57) ABSTRACT

A method and system that permits a user to navigate or browse a long list on a handheld device with a restricted user interface, such as a limited display and a limited user input device. The user first uses a coarse search to find a generally desired area in the list. The user then uses finer and finer search intervals in the vicinity of the desired area, until the desired entry is located.

12 Claims, 6 Drawing Sheets

RESTRICTED USER INTERFACE NAVIGATION

PRIORITY CLAIM

The present application is a continuation of U.S. application Ser. No. 11/530,230 filed Sep. 8, 2006, which is a continuation of PCT Patent Application Number PCT/CA2005/000373, filed on Mar. 11, 2005, which claims priority from U.S. Provisional Patent Application No. 60/551,830, filed on Mar. 11, 2004, the contents of which are incorporated herein by reference.

FIELD OF THE INVENTION

The present invention relates generally to a method and system for interacting with a restricted user interface on a handheld device, such as a mobile communications device. More particularly, the present invention relates to a method and system for navigating a list on a handheld device having a restricted user interface.

BACKGROUND OF THE INVENTION

Typical handheld devices have limited display areas, limited available memory, slower processors, and limited user input devices in comparison to desktop computer systems. These devices may also communicate over a bandwidth-limited data network, such as a wireless packet data network, or a cellular network using a digital packet data protocol. The limited display areas of these devices restrict the amount of information that can be displayed to a user at any given time. The limited user input devices, such as scroll keys, thumbwheels and keypads, can make user interaction with displayed information, such as long lists, cumbersome.

As the capabilities of handheld devices expand, it is becoming apparent that current techniques for searching, or navigating, menus, lists and other stored information are inadequate. It is not uncommon for a user to be presented with long lists of information, such as street indexes in a Global Positioning System (GPS) device or email lists on a handheld email client. To locate a specific entry of interest, the user must, for example, scroll through each entry in the list until the desired entry is found. This technique can be time consuming and aggravating, and becomes impractical as list lengths increase. Another common technique involves entering a data search query using keyboard emulation and laborious text entry, or using a tiny keyboard incorporated in the handheld device. Such techniques are not only time consuming, but tend to require fine control and two-handed input by the user.

It is, therefore, desirable to provide an improved technique for navigating or searching through large amounts of information, such as long lists, that is quick, simple, intuitive, adapted to the limited displays of typical handheld devices, and can be performed single-handed.

SUMMARY OF THE INVENTION

It is an object of the present invention to obviate or mitigate at least one disadvantage of previous methods and systems for navigating lists and sorted data on a handheld device with a restricted user interface.

In a first aspect, there is provided a method of navigating a list on a handheld device. The list can be any sorted arrangement of data. The method commences with displaying a first portion of the list. Further portions of the list, at a first coarse interval from each preceding portion, are then displayed until a desired section of the list is located. The list is then searched up or down at a second finer interval to permit a user to locate a desired list entry. This method can also include a step of selecting the desired list entry. Typically, the further portions are displayed, the second finer interval is set, and the scrolling through the list, are in response to user actuation of an input device.

In a further aspect, there is provided a system for navigating a list on a handheld device. The system comprises a display, a limited input device and a navigation engine. The display is limited to displaying a portion of the list. The limited input device can be, for example, a scroll key or thumbwheel. The navigation engine is responsive to user actuation of the limited input device and coupled to an information source for storing the list. The navigation engine includes an information presentation component, a coarse interval component, and a fine interval component. The information presentation component retrieves portions of the list from the information source and displays the portions of the list on the display. The information presentation component will, typically, be connected to a local or external information source. Where the information source is external, the connection is preferably wireless. The coarse interval component moves through the list at a first coarse interval to display further portions of the list, and the fine interval component moves through the list at a second finer interval after locating a desired section of the list at the coarse interval. Preferably, the system also includes an intermediate interval component for moving through the list at an intermediate interval.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system that permits a user to navigate or browse a long list on a handheld device with a restricted user interface, such as a limited display and a limited user input device. The method is analogous to the method used to locate a desired entry in a dictionary or a telephone book. The user first uses a coarse search to find a generally desired area in the list, much as a user would coarsely flip through a telephone book until at a particular letter. The user then uses finer and finer search intervals in the vicinity of the desired area, until the desired entry is located. This is intuitively similar to a user moving first by groups of pages, then page by page, and finally entry by entry on a single page.

Figure 1:
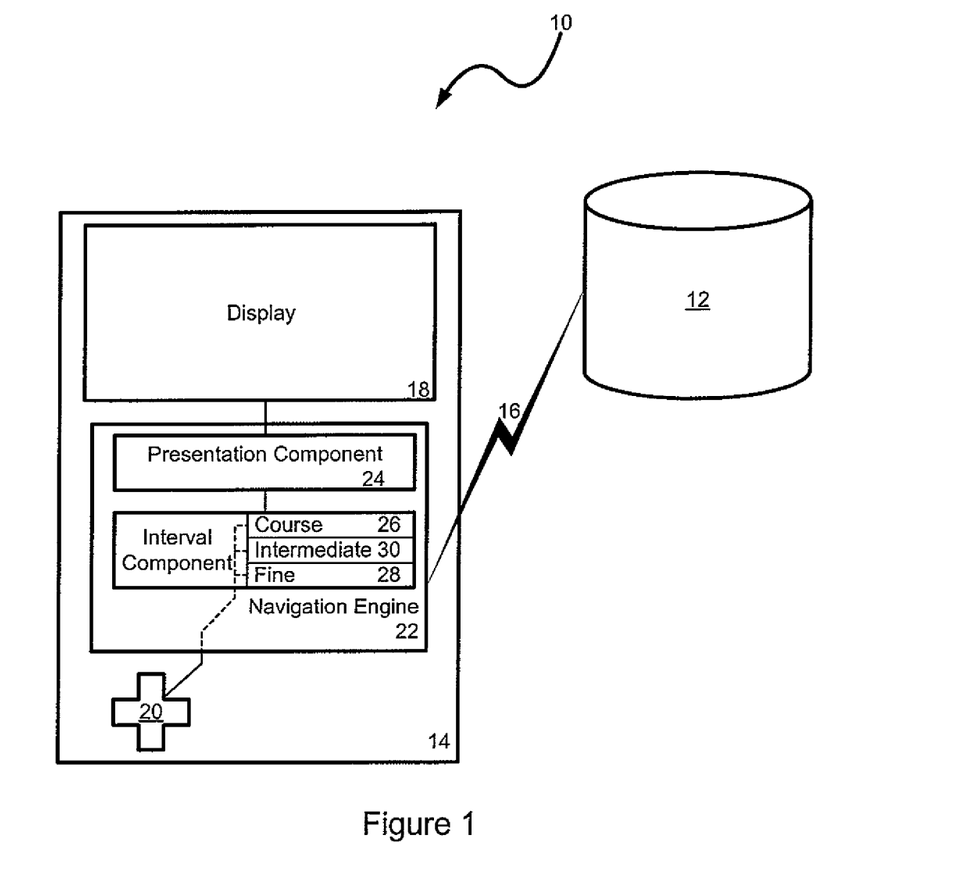
FIG. 1 is a block diagram of the system according to an embodiment of the present invention.

FIG. 1 shows a system 10 according to an embodiment of the present invention. This system 10 includes a database or information source 12 coupled to a user interface and handheld viewing device, preferably incorporated in a wireless handheld device 14. The information source 12 can include, for example, an Internet site, an Intranet site, a database engine, or a local storage means, such as flash memory or a memory card, incorporated into the handheld device. Where the information source 12 is external to the handheld device 14, the handheld device preferably communicates over a wireless network connection 16. The network 16 is preferably a wireless packet data network.

Figures 2A, 2B:
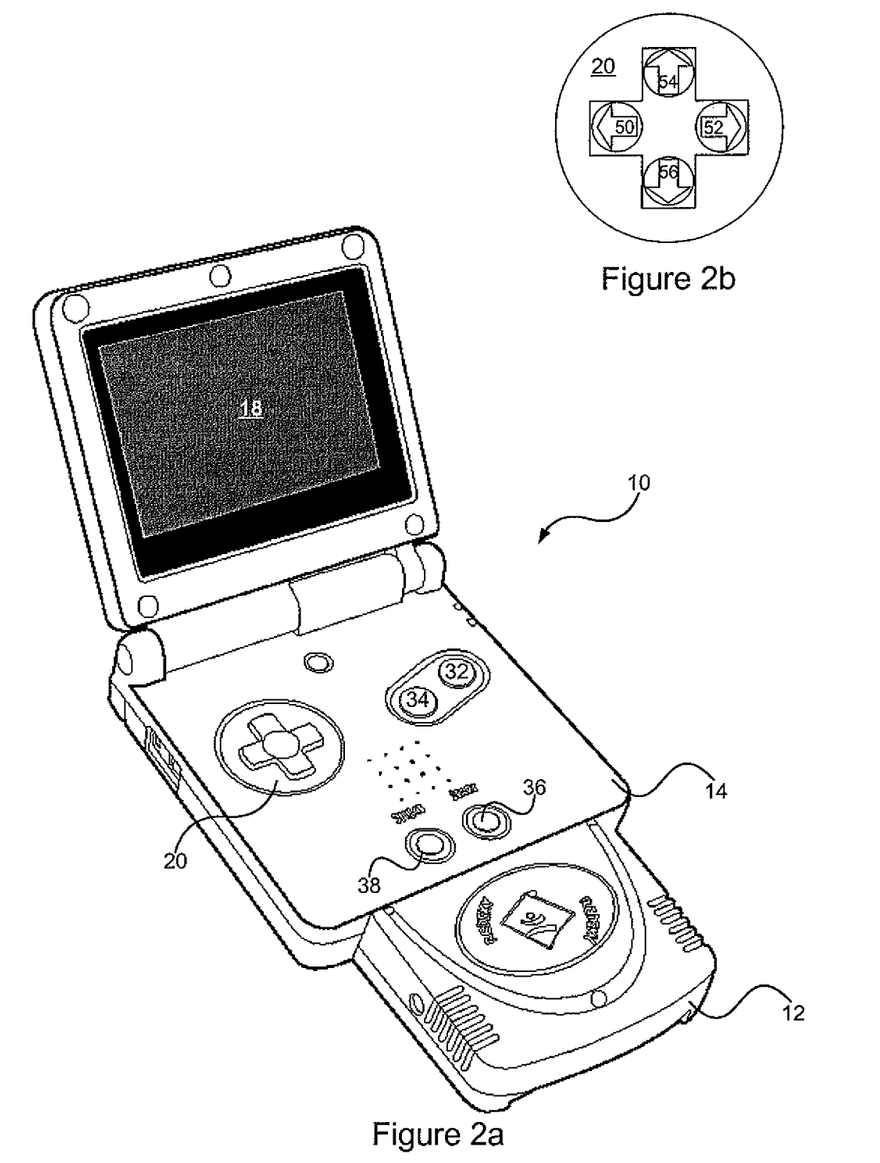
FIG. 2*a* shows a handheld digital gaming device.
FIG. 2*b* shows a limited user input device of the handheld digital gaming device of FIG. 2*a*.

Referring to FIGS. 1 and 2a, the handheld device 14 includes a limited display 18 with a restricted display area and a limited user input device 20, such as the illustrated scroll key, a thumbwheel, a touch pad, or other suitable directional input device, preferably operable by a single hand. As used herein, a directional input device is an input device that permits a user to indicate a direction, e.g., up or down, for scrolling through a list. The handheld device 14 also includes a navigation engine 22 coupled to the information source 12, and that permits navigation of large lists in response to actuation of the input device 20. Other input keys or devices can also be included on the handheld device, as shown by keys 32, 34, 36 and 38.

The navigation engine 22 includes an information presentation component 24, operating in conjunction with a coarse interval component 26 and a fine interval component 28 to display selected portions of the list on the display 18. The information presentation component 24 receives, decodes, formats and transmits portions of the list for display by the display 18. The size and format of the portions can be determined in accordance with the display type and resolution, the size of the display area and/or user-specified preferences. In a presently preferred embodiment, the navigation engine 22 also includes an intermediate interval component 30. Each of the interval components, or modules, determines a jump interval, or scroll gradient, used for traversing the list.

In a presently preferred embodiment, as illustrated in FIG. 2a, the handheld device 14 is a handheld digital gaming device, such as the Game Boy® manufactured by Nintendo®, preferably equipped with a wireless transceiver. However, as will be appreciated by those of skill in the art, the present invention may be incorporated into other handheld devices or wireless transceivers, such as two-way paging computers, personal digital assistants (PDAs), portable electronic messaging devices, cellular phones, or handheld e-mail clients. The handheld device 14 may be implemented using either a software-programmable digital signal processor (DSP) or a programmable logic device.

As shown in FIG. 2b, the scroll key 20 has four tabs 50, 52, 54 and 56 that can be pressed by a user to initiate device functions, such as moving a cursor or highlight bar in the directions indicated by the tabs (i.e., left—tab 50, right—tab 52, up—tab 54 and down—tab 56). The particular function initiated by actuation of one of the tabs, or a predetermined tab combination, is determined by the application program executing on the handheld device.

Figure 3:
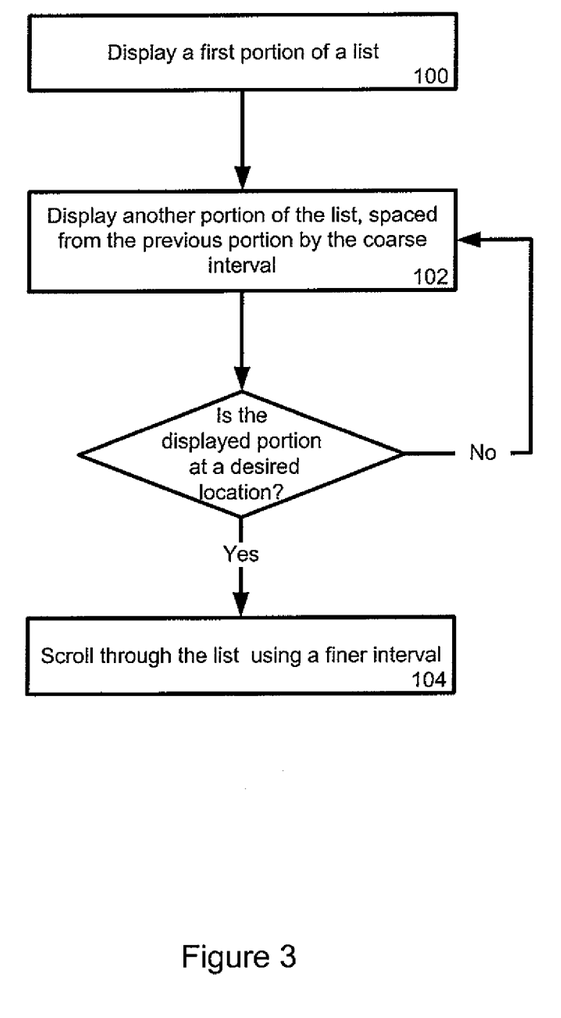
FIG. 3 is flow chart of a navigation method according to the present invention.

FIG. 3 shows a flowchart of the navigation method of the present invention. Referring to FIGS. 1-3, the method generally consists of navigating a list on a handheld device. As used herein, a list is any linear organization of data or information. The list may be organized or sorted in any suitable manner understandable to the user, such as alphabetically, numerically, by date, by color, or graphically. One skilled in the art will appreciate that any number of languages or character sets can be used to sort the list, including Roman, Kanji, Arabic, Hebrew, Hindi, Tamil and Cyrillic character sets.

The method begins with a first portion of the list being displayed on the display (100). The presentation of the first portion to the display is controlled by the information presentation component 24. This first portion can be any portion of the list, but will generally be the beginning of the list as determined by the sort criteria. Navigation through the list proceeds by displaying further portions of the list spaced apart from each other by a first coarse interval, until a desired section of the list is located (102). Generally, this step is accomplished by selecting a coarse interval, through activation of the coarse interval component 26, by, for example, pressing tab 50. Once the coarse interval is selected, pressing tabs 54 and 56 permits a user to move up and down the list, respectively, jumping by the coarse interval. For example, the coarse interval could be set to fifty entries, in which case each actuation of tab 54 or 56 would move the list by fifty entries, and display the appropriate portion beginning fifty entries from the previously displayed portion, in the direction specified by the user. In another embodiment, the coarse interval could be by eighths of the list length. In either example, the coarse interval determines the position to move to in the list, while the actual display of subsequent portions is controlled by the information presentation component 24, in communication with the information source 12.

Once a desired section of the list is located, the user can move through the list by a second finer interval to locate a desired list entry (104). This step is accomplished by selecting the second finer interval, through activation of the fine interval component 28, by, for example, pressing tab 52. Once the finer interval is selected, pressing tabs 54 and 56 permits a user to move up and down the list, respectively, jumping by the finer interval. For example, the finer interval could be set to ten entries, in which case each actuation of tab 54 or 56 would move the list by ten entries, and display the appropriate portion beginning ten entries from the preceding portion in the direction specified by the user. In a presently preferred embodiment, an intermediate interval between the coarse interval and the fine interval can also be activated to permit a user to further refine the positioning in the list prior to moving to the finer interval.

Once a desired list entry has been located, and is preferably visible in the display 18, an entry selection mode can be activated, such as by actuating one of the other buttons 32-38 through selection of a scrolling interval by further actuation of tab 52. In the entry selection mode, the tabs 54 and 56 can be used to, for example, move a cursor or highlight bar entry by entry within the displayed portion to the entry of interest, which can then be selected by appropriate key actuation.

Figure 4:
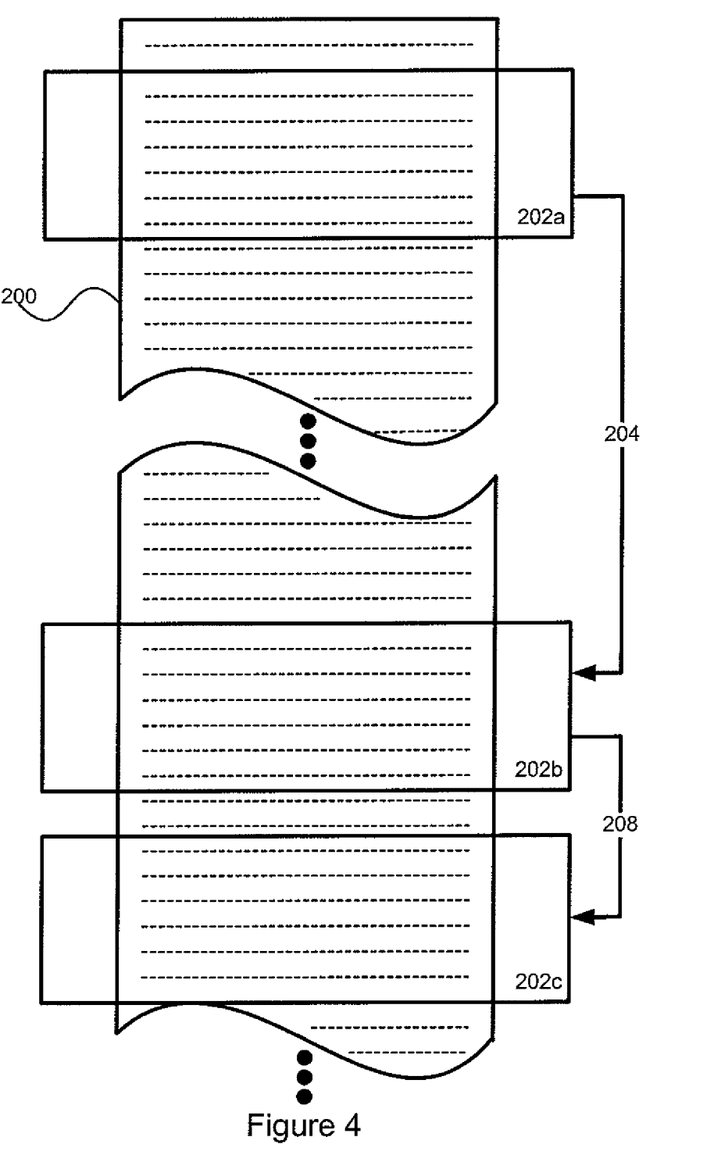
FIGS. 4-6 graphically illustrate three examples of the navigation method shown in FIG. 3.
Figure 5:
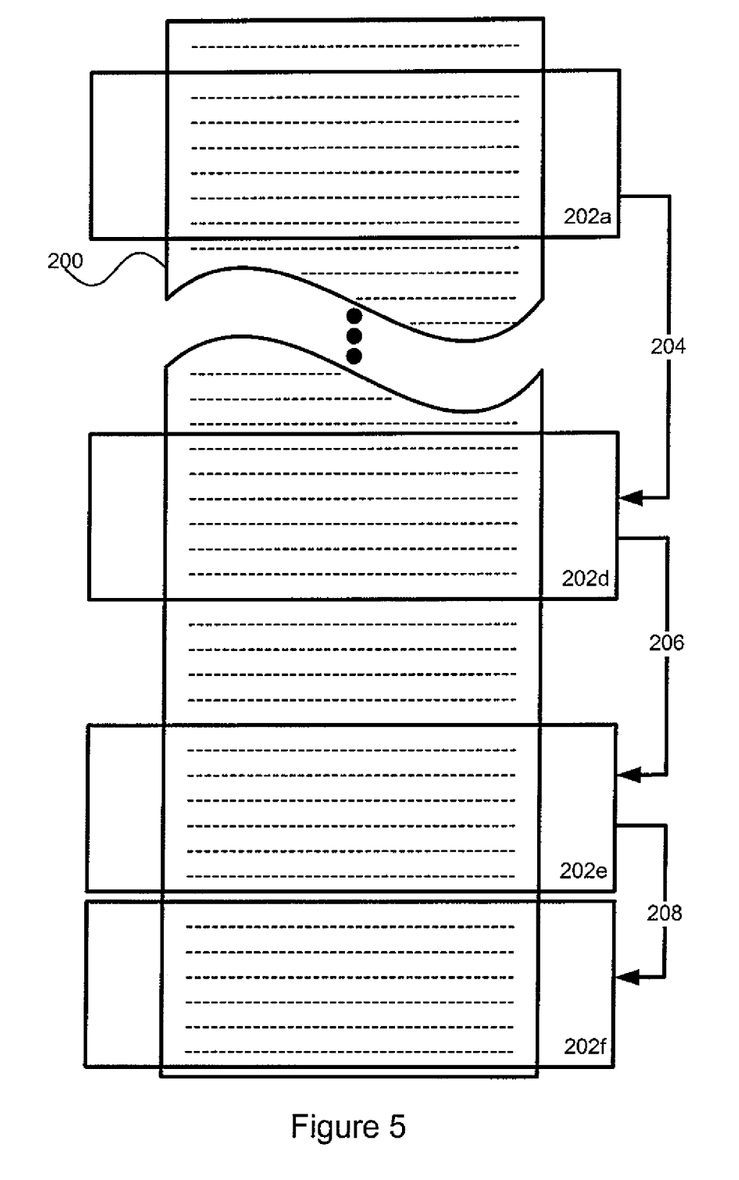
Figure 6:
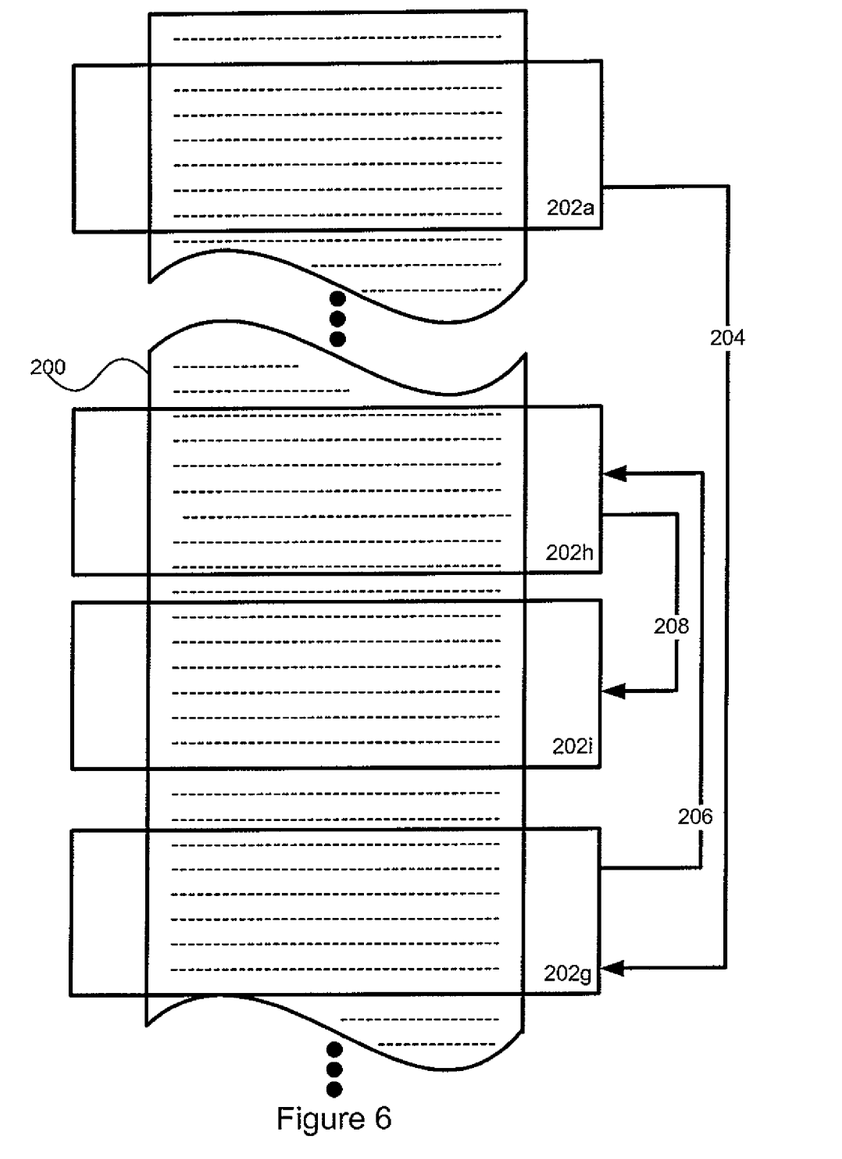

FIGS. 4-6 further exemplify the method of the present invention. A sorted list 200 is shown graphically in each drawing. The displayed portion is shown successively within the boxes 202a-202i, and coarse, intermediate and fine intervals are illustrated as arrows 204, 206 and 208, respectively. In the example shown at FIG. 4, a first portion 202a of the list 200 is displayed to the user. The user selects a coarse search interval, as described above, and actuates the user input to move down in the list by one coarse interval 204. The user determines that the desired list entry is likely closer than a full coarse interval from the displayed portion 202b, and, accordingly, selects a fine search interval. Actuation of the user input now causes the list to move down by one fine interval 208 to display a third portion 202c of the list. If the desired list entry is displayed in portion 202c, the user can move to select the entry, as described above. If not, the user can continue to search through the list at the fine interval, or can reselect the coarse interval to move more quickly through list to find an entry of interest.

In the example of FIG. 5, an intermediate search interval is also illustrated. As in the example of FIG. 4, a first portion 202a of the list 200 is displayed to the user. The user selects a coarse search interval, as described above, and actuates the user input to move down in the list by one coarse interval 204. The user determines that the desired list entry is likely closer than a full coarse interval from the displayed portion 202d, and, accordingly, selects an intermediate search interval. Actuation of the user input now causes the list to move down by one intermediate interval 206 to display a further portion 202e of the list. As the user is now homing in on the desired entry, he selects the fine search interval, and, by actuating the input device, causes a portion 202f of the list located a fine interval from portion 202e to be displayed. Again, if the desired list entry is displayed in portion 202f, the user can move to select the entry, as described above. If not, the user can continue to search through the list in either direction and at any of the coarse, intermediate or fine intervals.

Finally, the example of FIG. 6 shows how a desired entry can be bracketed to effectively do a bracketed search, such as a binary search, through the list. As in the previous examples, a first portion 202a of the list 200 is displayed to the user. The user selects a coarse search interval, as described above, and actuates the user input to move down in the list by one coarse interval 204 to display portion 202g. Having determined that the desired entry lies between the first portion 202a and the second portion 202g, the user selects the intermediate search interval, and moves up in the list by one intermediate interval 206 to display portion 202h. The user recognizes that the desired entry now lies between the previously displayed portion 202g and the currently displayed portion 202h. Therefore, the user selects the fine search interval, and moves down by one fine interval 208 to display portion 202i. If the desired list entry is displayed in portion 202i, the user can change to an entry selection mode and select the entry, or can continue to move down by fine intervals.

Those of skill in the art will recognize that the method and system of the present invention provide an efficient and intuitive means to effect a search within a long list, such as a GPS database, an email inbox, or an address book, associated with a handheld device application. The navigation through the list can be done quickly with iterative up and down key strokes. A system also presents an intuitive interface and search methodology to the user. By proper selection of an input device, only one digit is generally required for the search operation making it practical for single-handed use on a wide variety of handheld devices, such as cellular phones, pagers, email clients, PDAs, handheld GPS devices, and portable electronic messaging devices. Techniques such as scrolling through a list entry by entry, or cumbersome entry of search queries through an emulated keyboard, are avoided.

Because only a limited portion of the list is displayed at any given time, the complete list does not need to be downloaded to the device prior to initiating the search, and only those portions of the list that are currently being displayed need to be stored in the device. For example, the navigation engine can request a display's worth of list entries every time a jump is performed. This allows the handheld device to avoid downloading and storing a large list, as only the portions to be displayed are required. This also reduces the time taken to download the list, and reduces memory use. Thus, this invention frees up both memory and bandwidth. To prevent excessive delays, the navigation engine can, in some embodiments, pre-fetch portions of the list at various intervals, to further improve the user experience.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. A method comprising:
   displaying a first portion of a list at a display;
   moving through further portions of the list at the display, at a first coarse interval from each preceding portion, until a desired section of the list is located; and
   moving through the further portions of the list at the display by a second finer interval to locate a given list entry, wherein the further portions are displayed in response to actuation of an input device in a first dimension, and wherein the second finer interval is set in response to actuation of the input device in a second dimension orthogonal to the first dimension.

2. The method of claim 1, further comprising receiving an indication of selection of the given list entry.

3. The method of claim 1, further comprising moving through the further portions of the list at the display at an intermediate interval prior to the step of moving through the further portions of the list at the display at the second finer interval.

4. The method of claim 3, wherein the given list entry is bracketed at the intermediate interval.

5. The method of claim 1, wherein the list is sorted according to alphabet, number or date.

6. The method of claim 1, wherein the input device comprises one or more of a scroll key, a thumbwheel, a touchpad, a tabbed scroll key, and a directional pad.

7. A system comprising:
   a display enabled to provide a portion of a list;
   an input device enabled for movement in two dimensions; and
   a navigation engine, responsive to actuation of the input device, comprising:
      an information presentation component for retrieving portions of the list from a memory and displaying the portions of the list on the display;
      a coarse interval component for moving through the list at a first coarse interval to display further portions of the list, the moving being responsive to actuation of the input device in a first dimension and
      a fine interval component activated in response to actuation of the input device in a second dimension orthogonal to the first dimension for moving through the list at a second finer interval responsive to actuation of the input device in the first dimension after locating a desired section of the list at the coarse interval.

8. The system of claim 7, further comprising an intermediate interval component for moving through the list at an intermediate interval.

9. The system of claim 7, further comprising the memory storing the list.

10. The system of claim 7, wherein the memory is accessed over a wireless connection.

11. The system of claim 7, wherein the memory comprises a database.

12. The system of claim 7, wherein the input device comprises one or more of a scroll key, a thumbwheel, a touchpad, a tabbed scroll key, and a directional pad.

* * * * *